United States Patent [19]
Phillips

[11] Patent Number: 5,507,202
[45] Date of Patent: Apr. 16, 1996

[54] HANDLEBAR SAFETY GRIP

[76] Inventor: Robert C. Phillips, Flat 65 Queens Court, St Pauls Road, Clifton, Bristol, United Kingdom

[21] Appl. No.: 207,551

[22] Filed: Mar. 7, 1994

[30] Foreign Application Priority Data

Mar. 5, 1993 [GB] United Kingdom ............... 9304580

[51] Int. Cl.$^6$ .................... B62K 11/14; B62K 23/06; B62L 3/02
[52] U.S. Cl. ................. 74/489; 74/502.2; 74/526; 74/551.9
[58] Field of Search .............. 74/488, 489, 502.2, 74/551.9, 526; D8/303

[56] References Cited

U.S. PATENT DOCUMENTS

| | | | |
|---|---|---|---|
| D. 284,259 | 6/1986 | Dury | D8/303 |
| D. 299,333 | 1/1989 | Cove | D8/303 X |
| D. 311,676 | 10/1990 | Neal | D8/303 |
| D. 335,437 | 5/1993 | Wilson | D8/303 |
| 3,720,111 | 3/1973 | Guyton | 74/489 |
| 3,733,922 | 5/1973 | Tripp | 74/489 X |
| 4,149,432 | 4/1979 | Costahaude | 74/489 |
| 4,416,166 | 11/1983 | Jannard et al. | D8/303 X |
| 4,762,018 | 8/1988 | Yoshigai | 74/551.9 X |
| 4,838,113 | 6/1989 | Matsushima et al. | 74/551.9 X |

FOREIGN PATENT DOCUMENTS 3-21583  1/1991  Japan ................. 74/551.9

*Primary Examiner*—Allan D. Herrmann
*Attorney, Agent, or Firm*—Gifford, Krass, Groh, Sprinkle, Patmore, Anderson & Citkowski

[57] ABSTRACT

A motorcycle handlebar safety grip has a stopper (1) which has two main functions in preventing the rider from injury. Through the shape of both the clutch and brake levers on off-road motorcycles, and the positioning of the stopper (1) to the rear of the grip, it is not possible for these levers to come fully into the handlebars and crush a rider's fingers. This incident is most common when a rider falls to the ground and his hands are still in contact with the handlebars, resulting in the finger tips of the rider being squashed between the lever and the handlebars. Through the stopper (1) surrounding the circumference to the rear of the grips, a slope is created, therefore preventing the riders hands in wet weather conditions from sliding off either end of the grips and enabling the rider to gain greater control of the motorcycle.

4 Claims, 1 Drawing Sheet

HANDLEBAR SAFETY GRIP

BACKGROUND OF THE INVENTION

This invention relates to safety gripe for off-road motorcycle activities and the like.

Motorcycle grips are positioned on the ends of the motorcycle handlebars to enable a rider to grip and manoeuver the motorcycle while in motion.

To this present day, few off-road motorcycle grips offer any means of safety to prevent the rider from injury in the event of a collision or of the rider being thrown to the ground. In particular they do not prevent the rider's fingers from being crushed between the brake or clutch lever of the motorcycle and the respective handlebar. Also, in wet weather, there is often nothing to prevent the rider's hands from slipping off the ends of the grips.

OBJECT OF THE INVENTION

The object of the present invention is to provide an improved handlebar grip which has safety features for reducing the danger to a rider in the event of an accident.

SUMMARY OF THE INVENTION

According to the present invention there is provided a handlebar safety grip adapted to be fitted in use to a handlebar having a brake or clutch lever pivoted thereon, comprising an elongate main grip body and a stop member projecting in a radial direction from the main body towards the brake or clutch lever at a position such that the stop member is contactable in use by the brake or clutch lever to limit its movement towards the grip body to leave a space between the grip body and the lever so as to prevent a rider's fingers from being crushed between the lever and the main grip body in the event of an impact on the lever.

BRIEF DESCRIPTION OF THE DRAWINGS

A grip according to the invention will now be described by way of example with reference to the accompanying drawings in which.

DESCRIPTION OF THE PREFERRED EMBODIMENT

Figure 1:
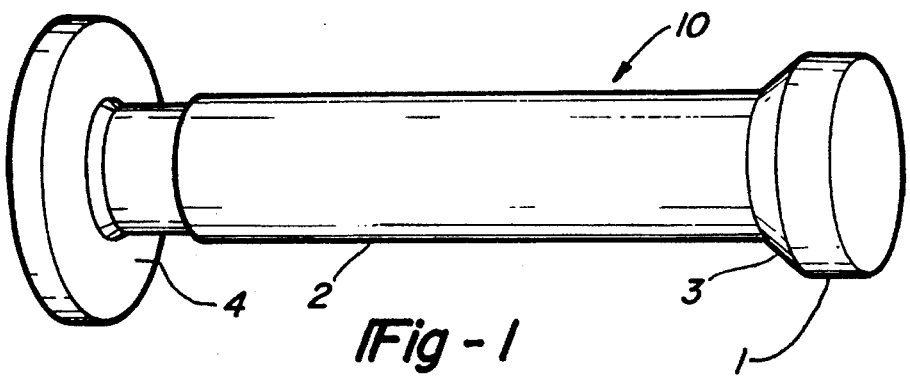
FIG. 1 is a perspective view of the grip.
Figure 2:
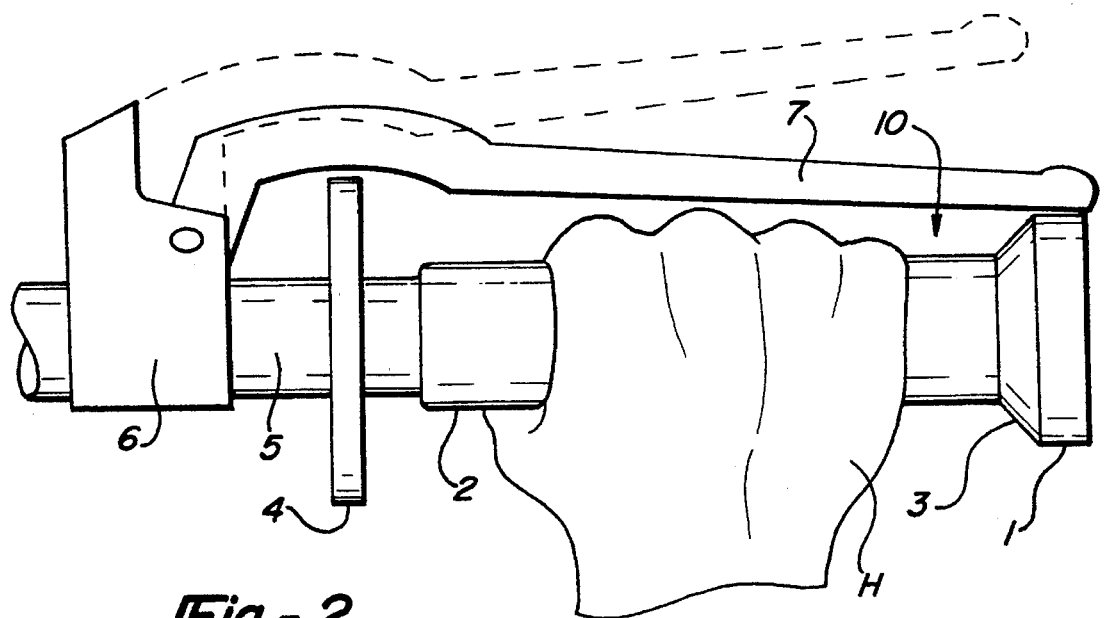
FIG. 2 is a side elevation of the grip of FIG. 1.

With reference to the drawings, the grip generally indicated 10 includes a main body 2 of generally hollow, cylindrical form closed at one end by a coaxial member 1 of larger diameter than the body 2 and joined to it by a sloping shoulder 3 of generally frusto-conical form. The opposite end of the body 2 from the stop member 1 is formed with a radially-projecting flange 4. The body 2 is shown in use fitted axially onto the free end portion of a motorcycle handlebar 5 with the flange 4 adjacent to a mount 6 for a lever 7 which may be a brake or clutch lever (not shown) and with the stop member 1 covering the end of the handlebar.

The grip 10 is so dimensioned and configured that, when fitted to a motorcycle handlebar as indicated above, a rider may grip the main body 2 to manoeuvre the motorcycle. Should the grip become wet and the rider's hand indicated as H tend to slip along the grip, it will be prevented from slipping off the end by the flange 4 or the stop member 1 respectively.

It will be appreciated that the motorcycle handlebars will be fitted with a grip 10 at each end and with a brake lever adjacent to one grip 10 and a clutch lever adjacent the other grip 10. Each lever is mounted and arranged in the conventional manner, so as to extend longitudinally adjacent but spaced from the respective grip 10 so as to be operable by the rider's hand gripping that grip.

In the event of a collision, whether against an obstacle or with the ground, in which the brake or clutch lever is knocked towards the respective grip 10, the stop member 1 of the grip 10 serves as an abutment for the free end of the lever. Should the rider's hand be grasping the grip at that moment, the movement of the lever will therefore be stopped by the stop member 1 before it contacts the rider's hand, thereby preventing injury.

I claim:

1. A handlebar fitment comprising, in combination, a handlebar safety grip and a manually operable control lever, said safety grip comprising an elongate, hollow, main grip body adapted at one end to be fitted axially onto a handlebar so as to cover a free end portion thereof and having a stop member projecting radially therefrom at a position spaced from said one end, and said control lever being adapted to be pivotally mounted by a control end in use on said handlebar adjacent said one end of said main grip body to extend generally longitudinally of said grip body for pivotal operation by a rider's hand placed on said main grip body, wherein said control lever and said stop member are so shaped and arranged that pivotal movement of said control lever towards said main grip body is stopped by contact of a free end portion of said control lever with said stop member in such a position that a space is left between said control lever and said main grip body along the entire length of said main grip body sufficient to accommodate the rider's fingers and avoid these being crushed in the event that said control lever is forcibly pressed against said safety grip.

2. The handlebar fitment as described in claim 1, wherein said stop member circumferentially surrounds said main body.

3. The handlebar fitment as described in claim 1, wherein said main grip body and said stop member are generally cylindrical, coaxial and interconnected by a frusto-conical shoulder.

4. The handlebar fitment as described in claim 1, wherein said main grip body has an outwardly projecting flange at its end opposite said stop member for preventing a rider's hand gripping said main grip body from slipping off said opposite end of said main grip body.

* * * * *